(12) United States Patent
Wang

(10) Patent No.: US 10,775,587 B2
(45) Date of Patent: Sep. 15, 2020

(54) CAMERA OPTICAL LENS

(71) Applicant: AAC Acoustic Technologies (Shenzhen) Co., Ltd., Shenzhen (CN)

(72) Inventor: Jianming Wang, Shenzhen (CN)

(73) Assignee: AAC Communication Technologies (Changzhou) Co., Ltd., Changzhou (CN)

( * ) Notice: Subject to any disclaimer, the term of this patent is extended or adjusted under 35 U.S.C. 154(b) by 137 days.

(21) Appl. No.: 16/102,006

(22) Filed: Aug. 13, 2018

(65) Prior Publication Data

US 2019/0154956 A1   May 23, 2019

(30) Foreign Application Priority Data

Nov. 17, 2017   (CN) .......................... 2017 1 1143845
Nov. 17, 2017   (CN) .......................... 2017 1 1144082

(51) Int. Cl.
*G02B 9/60*   (2006.01)
*G02B 13/00*   (2006.01)
*G02B 27/00*   (2006.01)

(52) U.S. Cl.
CPC ........... *G02B 9/60* (2013.01); *G02B 13/0025* (2013.01); *G02B 13/0045* (2013.01); *G02B 27/0037* (2013.01)

(58) Field of Classification Search
CPC .......... G02B 3/02; G02B 3/04; G02B 13/001; G02B 13/0015; G02B 13/002; G02B 13/0045; G02B 13/18; G02B 13/24; G02B 9/64; G02B 9/62; G02B 27/0025; G02B 27/005
USPC ................ 359/708, 713, 714, 754, 763, 764
See application file for complete search history.

(56) References Cited

U.S. PATENT DOCUMENTS

| | | | | |
|---|---|---|---|---|
| 9,915,809 | B1 * | 3/2018 | Wang ................. | G02B 13/0045 |
| 9,927,599 | B1 * | 3/2018 | Wang ....................... | G02B 9/60 |
| 10,120,167 | B2 * | 11/2018 | Wang ....................... | G02B 9/60 |
| 2016/0320590 | A1 * | 11/2016 | Mori ................. | G02B 13/0045 |
| 2017/0293113 | A1 * | 10/2017 | Wang ....................... | G02B 9/60 |

* cited by examiner

*Primary Examiner* — Marin Pichler
(74) *Attorney, Agent, or Firm* — IPro, PLLC; Na Xu

(57) ABSTRACT

The present disclosure discloses a camera optical lens. The camera optical lens includes, in an order from an object side to an image side, an aperture, a first lens, a second lens, a third lens, a fourth lens, and a fifth lens. The camera optical lens further satisfies specific conditions.

9 Claims, 5 Drawing Sheets

CAMERA OPTICAL LENS

FIELD OF THE PRESENT DISCLOSURE

The present disclosure relates to optical lens, in particular to a camera optical lens suitable for handheld devices such as smart phones and digital cameras and imaging devices.

DESCRIPTION OF RELATED ART

With the emergence of smart phones in recent years, the demand for miniature camera lens is increasing day by day, but the photosensitive devices of general camera lens are no other than Charge Coupled Device (CCD) or Complementary metal-Oxide Semiconductor Sensor (CMOS sensor), and as the progress of the semiconductor manufacturing technology makes the pixel size of the photosensitive devices shrink, coupled with the current development trend of electronic products being that their functions should be better and their shape should be thin and small, miniature camera lens with good imaging quality therefor has become a mainstream in the market. In order to obtain better imaging quality, the lens that is traditionally equipped in mobile phone cameras adopts a three-piece or four-piece lens structure. And, with the development of technology and the increase of the diverse demands of users, and under this circumstances that the pixel area of photosensitive devices is shrinking steadily and the requirement of the system for the imaging quality is improving constantly, the five-piece, six-piece and seven-piece lens structure gradually appear in lens design. There is an urgent need for ultra-thin wide-angle camera lenses which have good optical characteristics and the chromatic aberration of which is fully corrected.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
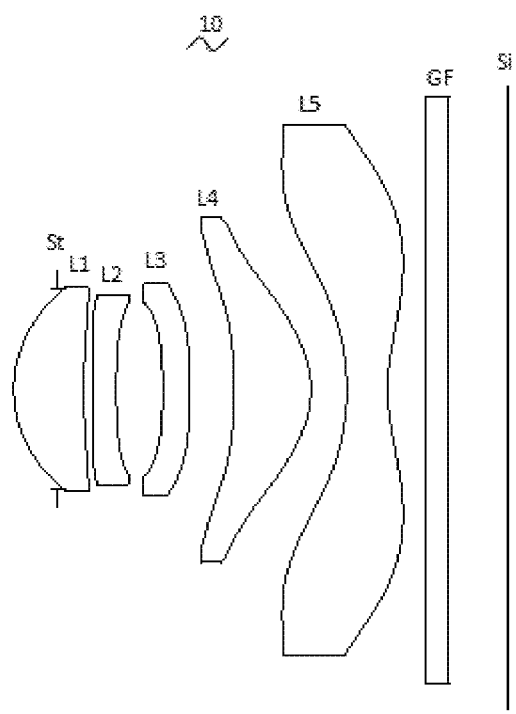
FIG. 1 is a schematic diagram of a camera optical lens in accordance with a first embodiment of the present invention.

As referring to FIG. 1, the present invention provides a camera optical lens 10. FIG. 1 shows the camera optical lens 10 of embodiment 1 of the present invention, the camera optical lens 10 comprises 5 lenses. Specifically, from the object side to the image side, the camera optical lens 10 comprises in sequence: an aperture St, a first lens L1, a second lens L2, a third lens L3, a fourth lens L4, and a fifth lens L5. Optical element like optical filter GF can be arranged between the fifth lens L5 and the image surface Si.

In this embodiment, the first lens L1 has a positive refractive power with a convex object side surface relative to the proximal axis, the aperture St is arranged between the object and the first lens L1. The second lens L2 has a negative refractive power with a concave image side surface relative to the proximal axis. The third lens L3 has a negative refractive power with a concave object side surface relative to the proximal axis and a convex image side surface relative to the proximal axis. The fourth lens L4 has a positive refractive power with a concave object side surface relative to the proximal axis and a convex image side surface relative to the proximal axis, the fifth lens L5 has a negative refractive power with a concave object side surface relative to the proximal axis.

Here, the focal length of the whole camera optical lens 10 is defined as f, the focal length of the first lens L1 is defined as f1, the focal length of the second lens L2 is defined as f2, the focal length of the third lens L3 is defined as f3, the focal length of the fourth lens L4 is defined as f4, the focal length of the fifth lens L5 is defined as f5, the refractive power of the second lens L2 is defined as n2, the refractive power of the third lens L3 is defined as n3, the thickness on-axis of the second lens L2 is defined as d3, the thickness on-axis of the third lens L3 is defined as d5, the curvature radius of the object side surface of the second lens L2 is defined as R3, the curvature radius of the image side surface of the second lens L2 is defined as R4. The following condition should satisfied: $0.75<f1/f<0.80$, $-2.1<f2/f<-1.9$, $-15<f3/f<-13$, $0.57<f4/f<0.61$, $-0.52<f5/f<-0.48$; $3.6<n2*n3<3.9$, $17<1/(d3*d5)<19$, $0.7<(R3+R4)/(R3-R4)<0.8$.

When the focal length of the camera optical lens 10 of the present invention, the focal length of each lens, the refractive power of the related lens, the thickness on-axis and the curvature radius of the camera optical lens satisfy the above conditions, the camera optical lens 10 has the large of aperture, the large of imaging height and more suitable for portable camera In this embodiment, the focal length of the first lens L1 is defined as f1, the focal length of the second lens L2 is defined as f2, the focal length of the third lens L3 is defined as f3, the focal length of the fourth lens L4 is defined as f4, and the focal length of the fifth lens L5 is defined as f5. Here the following condition should satisfied: $2.9<f1<3.1$, $-7.9<f2<-7.4$, $-58<f3<-50$, $2.2<f4<2.4$, $-2.1<f5<-1.9$. The unit of distance, radius and center thickness is mm. With such design, the total optical length TTL of the whole camera optical lens 10 can be made as short as possible, thus the miniaturization characteristics can be maintained.

Preferably, the total optical length TTL of the camera optical lens 10 is less than or equal to 4.6 mm. This design helps the camera optical lens 10 facilitates miniaturization characteristics. The aperture F number of the camera optical lens is less than or equal to 1.9, this design helps the large aperture of the camera optical lens 10 to achieve, which can improve the imaging performance in a low-illumination environment.

In the camera optical lens 10 of the present invention, each lens is made of glass material or plastic material, if the lens is made of glass material, which can increase the freedom of the refractive power configuration of the optical system of the present invention, if the lens material is plastic, the production cost can be effectively reduced.

In this embodiment, the first lens L1 is made of plastic material, the second lens L2 is made of glass material, the third lens L3 is made of glass material, the fourth lens L4 is made of plastic material, the fifth lens L5 is made of plastic material, This design effectively improves the optical performance of the camera optical lens 10, and provides the camera lens 10 with better reliability under different conditions of temperature and humidity.

In this embodiment, the thickness on-axis of the second lens L2 is defined as d3, the thickness on-axis of the third lens L3 is defined as d5. Preferably, the following condition shall be satisfied, $0.8 < d3/d5 < 0.9$. This design helps the second lens L2 and the third lens L3 have an optimal thickness to realize configuration of the system.

In this embodiment, the refractive index of the first lens L1 is defined as n1, the refractive index of the second lens L2 is defined as n2, the refractive index of the third lens L3 is defined as n3, the refractive index of the fourth lens L4 is defined as n4, the refractive index of the fifth lens L5 is defined as n5, the following condition shall be satisfied, $1.5 < n1 < 1.6$, $1.8 < n2 < 1.9$, $1.9 < n3 < 2.1$, $1.53 < n4 < 1.55$, $1.52 < n5 < 1.55$. Such design enables the lenses made from different optical materials to match each other better, and further enables the camera lens 10 to perform better imaging quality. nd: The refractive index of the d line;

In this embodiment, the abbe number of the first lens L1 is defined as v1, the abbe number of the second lens L2 is defined as v2, the abbe number of the third lens L3 is defined as v3, the abbe number of the fourth lens L4 is defined as v4, the abbe number of the fifth lens L5 is defined as v5. Here the following condition should satisfied: $55 < v1 < 57$, $23 < v2 < 25$, $19 < v3 < 21$, $55 < v4 < 57$, $55 < v5 < 57$. The satisfied condition is beneficial to correction of aberration. This design can suppress optical color difference when the optical lens 10 works.

Configurations of refractive index and abbe number of the lenses mentioned above can be combined and applied for designing the camera optical lens 10. Therefore, the second lens L2 and the third lens L3 made from optical materials with high refractive index and low abbe number can effectively reduce color difference of the system and greatly improve the imaging quality of the camera optical lens 10.

Besides, surfaces of the lens are configured to be aspherical for approaching more controllable variables to correct abberations, reduce the amount of the lenses, and further to reduce the total length of the camera lens.

Preferably, inflexion points and/or arrest points can also be arranged on the object side surface and/or image side surface of the lens, so that the demand for high quality imaging can be satisfied, the description below can be referred for specific implementable scheme.

The design information of the camera optical lens 10 in the first embodiment of the present invention is shown in the tables 1 and 2.

TABLE 1

| focal length (mm) | |
|---|---|
| f | 3.894 |
| f1 | 3.041 |
| f2 | −7.634 |
| f3 | −53.779 |
| f4 | 2.308 |
| f5 | −1.962 |

Where:
the meaning of the various symbols is as follows.
f: the focal length of the camera optical lens 10;
f1: the focal length of the first lens;
f2: the focal length of the second lens;
f3: the focal length of the third lens;
f4: the focal length of the fourth lens;
f5: the focal length of the fifth lens.

TABLE 2

| | | Curvature radius (R) (mm) | Thickness/ Distance (d) (mm) | | Refractive power (nd) | | Abbe number (vd) |
|---|---|---|---|---|---|---|---|
| St | St | ∞ | d0= | −0.412 | | | |
| L1 | R1 | 1.369 | d1= | 0.651 | nd1 | 1.5441 v1 | 56.12 |
| | R2 | 6.505 | d2= | 0.088 | | | |
| L2 | R3 | −55.344 | d3= | 0.215 | nd2 | 1.8470 v2 | 23.80 |
| | R4 | 7.397 | d4= | 0.435 | | | |
| L3 | R5 | −8.382 | d5= | 0.255 | nd3 | 2.0240 v3 | 20.41 |
| | R6 | −10.024 | d6= | 0.412 | | | |
| L4 | R7 | −6.086 | d7= | 0.718 | nd4 | 1.5441 v4 | 56.12 |
| | R8 | −1.087 | d8= | 0.336 | | | |
| L5 | R9 | −2.583 | d9= | 0.377 | nd5 | 1.5352 v5 | 56.12 |
| | R10 | 1.870 | d10= | 0.363 | | | |
| Glass | R11 | ∞ | d11= | 0.210 | ndg | 1.5168 vg | 64.17 |
| | R12 | ∞ | d12= | 0.544 | | | |

In which, R1 and R2 represent respectively the object side surface and image side surface of the first lens L1, R3 and R4 represent respectively the object side surface and image side surface of the second lens L2, R5 and R6 represent respectively the object side surface and image side surface of the third lens L3, R7 and R8 represent respectively the object side surface and image side surface of the fourth lens L4, R9 and R10 represent respectively the object side surface and image side surface of the fifth lens L5, R11 and R12 represent respectively the object side surface and image side surface of the optical filter GF. Other, the meaning of the various symbols is as follows.

d0: The distance on-axis from aperture St to the object side surface of the first lens L1;
d1: The thickness on-axis of the first lens L1;
d2: The distance on-axis from the image side surface of the first lens L1 to the object side surface of the second lens L2;
d3: The thickness on-axis of the second lens L2;
d4: The distance on-axis from the image side surface of the second lens L2 to the object side surface of the third lens L3;
d5: The thickness on-axis of the third lens L3;
d6: The distance on-axis from the image side surface of the third lens L3 to the object side surface of the fourth lens L4;
d7: The thickness on-axis of the fourth lens L4;
d8: The distance on-axis from the image side surface of the fourth lens L4 to the object side surface of the fifth lens L5;
d9: The thickness on-axis of the fifth lens L5;

d10: The distance on-axis from the image side surface of the fifth lens L5 to the object side surface of the optical filter GF;
d11: The thickness on-axis of the optical filter GF;
d12: The distance on-axis from the image side surface to the image surface of the optical filter GF;
nd1: The refractive index of the first lens L1;
nd2: The refractive index of the second lens L2;
nd3: The refractive index of the third lens L3;
nd4: The refractive index of the fourth lens L4;
nd5: The refractive index of the fifth lens L5;
ndg: The refractive index of the optical filter GF;
v1: The abbe number of the first lens L1;
v2: The abbe number of the second lens L2;
v3: The abbe number of the third lens L3;
v4: The abbe number of the fourth lens L4;
v5: The abbe number of the fifth lens L5;
vg: The abbe number of the optical filter GF.

Table 3 shows the aspherical surface data of the camera optical lens 10 in the embodiment 1 of the present invention.

TABLE 3

| | Conic Index | Aspherical Surface Index | | | | | | |
|---|---|---|---|---|---|---|---|---|
| | k | A4 | A6 | A8 | A10 | A12 | A14 | A16 |
| R1 | 1.6377E−02 | −7.4167E−03 | 7.1564E−02 | −1.9975E−01 | 3.4608E−01 | −3.8271E−01 | 2.5458E−01 | −8.1415E−02 |
| R2 | −7.0014E+01 | 6.2432E−03 | −1.5746E−01 | 6.4610E−01 | −1.3710E+00 | 1.6516E+00 | −1.0795E+00 | 2.9112E−01 |
| R3 | 9.9005E+01 | −9.9664E−03 | 1.0464E−01 | −2.7870E−02 | −6.2843E−02 | 6.7391E−02 | −8.9385E−03 | −1.6333E−03 |
| R4 | 3.1155E+01 | −1.5741E−02 | 6.6423E−01 | −3.1850E+00 | 9.8108E+00 | −1.7071E+01 | 1.5582E+01 | −5.7877E+00 |
| R5 | 8.7074E+01 | −1.7794E−01 | 3.3579E−01 | −1.7536E+00 | 5.5376E+00 | −1.0168E+01 | 9.8691E+00 | −3.8933E+00 |
| R6 | 7.8801E+00 | −1.3753E−01 | 3.7414E−03 | 1.5635E−01 | −3.9659E−01 | 4.2934E−01 | −1.8481E−01 | 1.9001E−02 |
| R7 | 7.3876E+00 | −7.7688E−02 | 6.8501E−02 | −7.5199E−02 | 6.1766E−02 | −2.4337E−02 | 4.3987E−03 | −3.0737E−04 |
| R8 | −8.5912E−01 | 1.5242E−01 | −1.3689E−01 | 1.0527E−01 | −4.3231E−02 | 1.0710E−02 | −1.5350E−03 | 8.6724E−05 |
| R9 | −9.8005E+00 | −7.3743E−02 | 2.7326E−02 | −3.2888E−03 | 2.3675E−04 | −5.6286E−05 | 9.3820E−06 | −5.0260E−07 |
| R10 | −1.2909E+01 | −6.0845E−02 | 2.3231E−02 | −7.8839E−03 | 1.7405E−03 | −2.3914E−04 | 1.8924E−05 | −6.4883E−07 |

Table 4 and table 5 show the inflexion points and the arrest point design data of the camera optical lens 10 lens in embodiment 1 of the present invention. In which, R1 and R2 represent respectively the object side surface and image side surface of the first lens L1, R3 and R4 represent respectively the object side surface and image side surface of the second lens L2, R5 and R6 represent respectively the object side surface and image side surface of the third lens L3, R7 and R8 represent respectively the object side surface and image side surface of the fourth lens L4, R9 and R10 represent respectively the object side surface and image side surface of the fifth lens L5. The data in the column named "inflexion point position" are the vertical distances from the inflexion points arranged on each lens surface to the optic axis of the camera optical lens 10. The data in the column named "arrest point position" are the vertical distances from the arrest points arranged on each lens surface to the optic axis of the camera optical lens 10.

TABLE 4

| | Inflexion point number | Inflexion point position 1 | Inflexion point position 2 | Inflexion point position 3 |
|---|---|---|---|---|
| R1 | 1 | 1.025 | | |
| R2 | 1 | 0.745 | | |
| R3 | 1 | 0.325 | | |
| R4 | 1 | 0.875 | | |
| R5 | 0 | | | |
| R6 | 0 | | | |
| R7 | 2 | 1.115 | 1.445 | |
| R8 | 2 | 1.105 | 1.585 | |

TABLE 4-continued

| | Inflexion point number | Inflexion point position 1 | Inflexion point position 2 | Inflexion point position 3 |
|---|---|---|---|---|
| R9 | 1 | 1.305 | | |
| R10 | 3 | 0.575 | 2.455 | 2.675 |

TABLE 5

| | Arrest point number | Arrest point position 1 |
|---|---|---|
| R1 | 0 | |
| R2 | 1 | 0.995 |
| R3 | 1 | 0.465 |
| R4 | 0 | |
| R5 | 0 | |
| R6 | 0 | |
| R7 | 0 | |
| R8 | 0 | |

TABLE 5-continued

| | Arrest point number | Arrest point position 1 |
|---|---|---|
| R9 | 1 | 2.315 |
| R10 | 1 | 1.285 |

Figure 2:
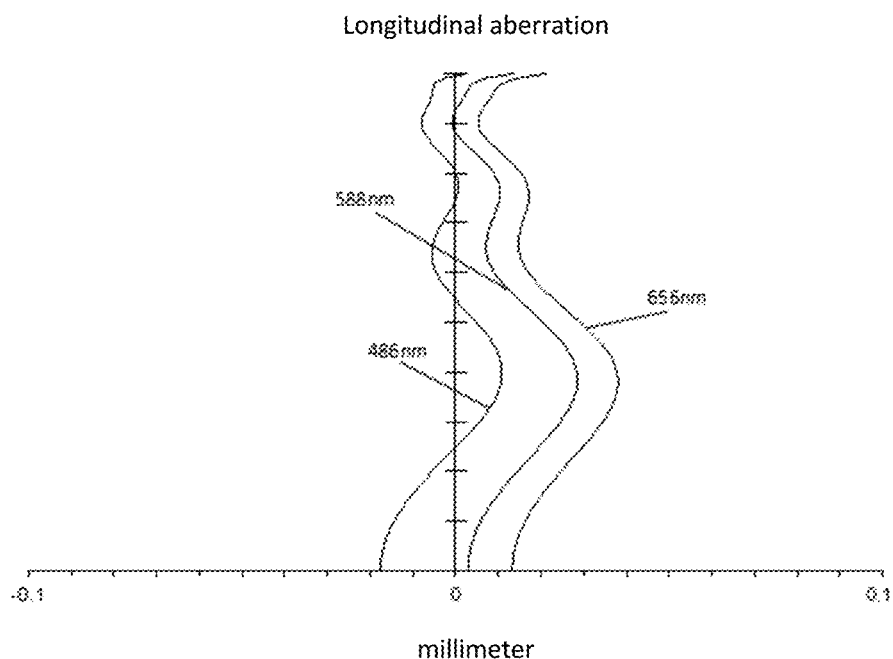
FIG. 2 shows the longitudinal aberration of the camera optical lens shown in FIG. 1.
Figure 3:
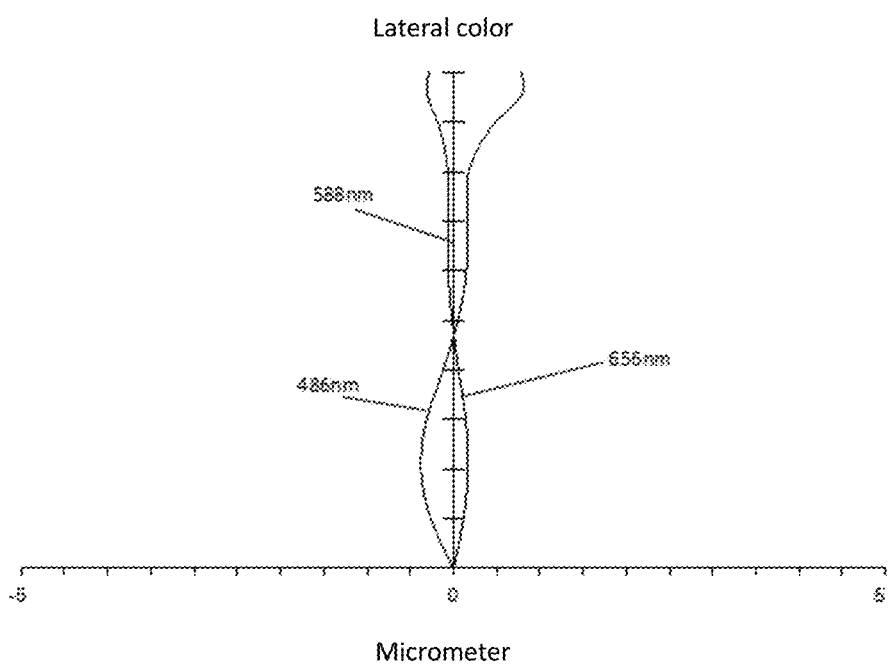
FIG. 3 shows the lateral color of the camera optical lens shown in FIG. 1.
Figure 4:
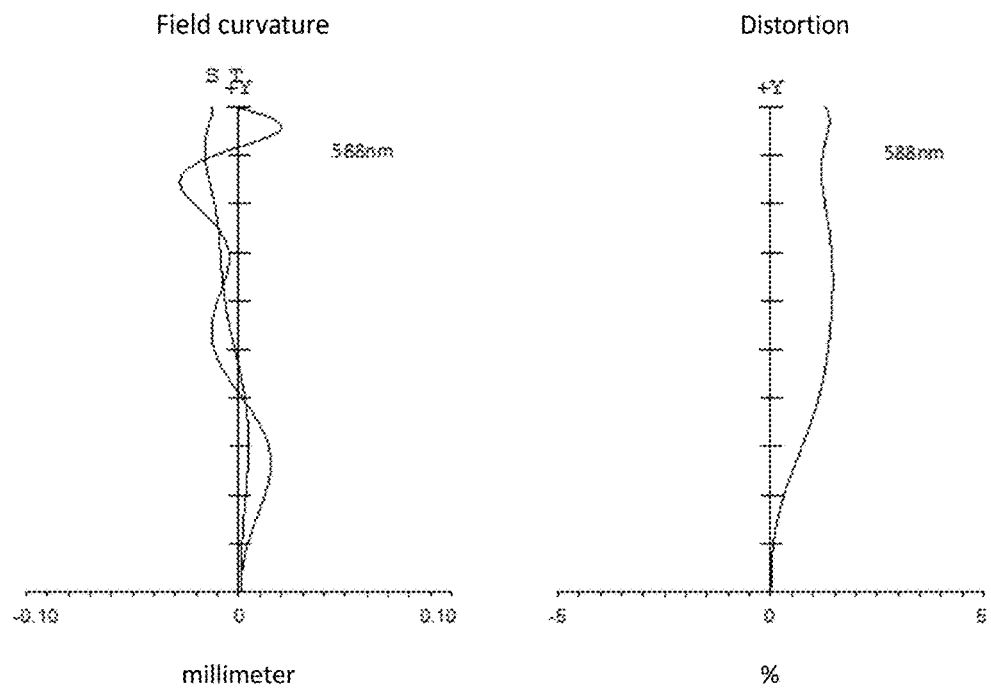
FIG. 4 presents a schematic diagram of the field curvature and distortion of the camera optical lens shown in FIG. 1.
Figure 5:
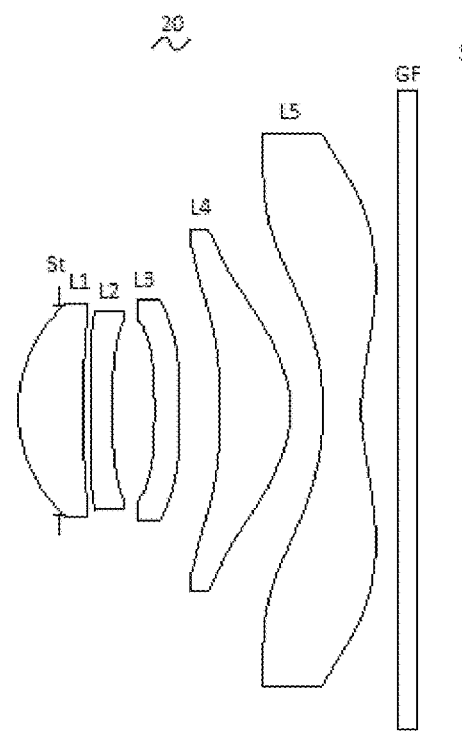
FIG. 5 is a schematic diagram of a camera optical lens in accordance with a second embodiment of the present invention.

FIG. 2 and FIG. 3 show the longitudinal aberration and lateral color schematic diagrams after light with a wavelength of 486 nm, 588 nm and 656 nm passes the camera optical lens 10 in the first embodiment. FIG. 4 shows the field curvature and distortion schematic diagrams after light with a wavelength of 588 nm passes the camera optical lens 10 in the first embodiment.

Table 6 shows the various values of the embodiments and the values corresponding with the parameters which are already specified in the conditions.

As shown in Table 6, the first embodiment satisfies the various conditions.

TABLE 6

| | Embodiment 1 |
|---|---|
| 0.75 < f1/f < 0.80 | 0.781026607 |
| −2.1 < f2/f < −1.9 | −1.960371957 |
| −15 < f3/f < −13 | −13.81075419 |
| 0.57 < f4/f < 0.61 | 0.592599883 |
| −0.52 < f5/f < −0.48 | −0.50383797 |
| 3.6 < n2*n3 < 3.9 | 3.738353858 |

TABLE 6-continued

|  | Embodiment 1 |
|---|---|
| 17 < 1/(d3*d5) < 19 | 18.23985408 |
| 0.7 < (R3 + R4)/(R3 − R4) < 0.8 | 0.764209556 |

In this embodiment, the pupil entering diameter of the camera optical lens is 2.06 mm, the full vision field image height is 3.261 mm, the vision field angle in the diagonal direction is 79.07°.

Embodiment 2

Embodiment 2 is basically the same as embodiment 1, the meaning of its symbols is the same as that of embodiment 1, in the following, only the differences are described.

Table 5, table 7 and table 8 show the design data of the camera optical lens 20 in embodiment 2 of the present invention.

TABLE 7

| focal length (mm) | |
|---|---|
| f | 3.893 |
| f1 | 3.047 |
| f2 | −7.619 |
| f3 | −52.990 |
| f4 | 2.302 |
| f5 | −1.964 |

Where:

In which, the meaning of the various symbols is as follows.

f: the focal length of the camera optical lens;
f1: the focal length of the first lens;
f2: the focal length of the second lens;
f3: the focal length of the third lens;
f4: the focal length of the fourth lens;
f5: the focal length of the fifth lens.

TABLE 8

|  |  | Curvature radius (R) (mm) | Thickness/ Distance (d) (mm) |  | Refractive power (nd) |  | Abbe number (vd) |
|---|---|---|---|---|---|---|---|
| St | St | ∞ | d0= | −0.412 |  |  |  |
| L1 | R1 | 1.370 | d1= | 0.648 | nd1 | 1.5441 | v1 | 56.12 |
|  | R2 | 6.464 | d2= | 0.088 |  |  |  |
| L2 | R3 | −57.405 | d3= | 0.216 | nd2 | 1.8470 | v2 | 23.80 |
|  | R4 | 7.345 | d4= | 0.429 |  |  |  |
| L3 | R5 | −8.387 | d5= | 0.257 | nd3 | 2.0240 | v3 | 20.41 |
|  | R6 | −10.059 | d6= | 0.413 |  |  |  |
| L4 | R7 | −6.215 | d7= | 0.714 | nd4 | 1.5441 | v4 | 56.12 |
|  | R8 | −1.088 | d8= | 0.332 |  |  |  |
| L5 | R9 | −2.647 | d9= | 0.383 | nd5 | 1.5352 | v5 | 56.12 |
|  | R10 | 1.842 | d10= | 0.367 |  |  |  |
| Glass | R11 | ∞ | d11= | 0.210 | ndg | 1.5168 | vg | 64.17 |
|  | R12 | ∞ | d12= | 0.548 |  |  |  |

In which, R1 and R2 represent respectively the object side surface and image side surface of the first lens L1, R3 and R4 represent respectively the object side surface and image side surface of the second lens L2, R5 and R6 represent respectively the object side surface and image side surface of the third lens L3, R7 and R8 represent respectively the object side surface and image side surface of the fourth lens L4, R9 and R10 represent respectively the object side surface and image side surface of the fifth lens L5, R11 and R12 represent respectively the object side surface and image side surface of the optical filter GF. Other, the meaning of the various symbols is as follows.

d0: The distance on-axis from aperture St to the object side surface of the first lens L1;
d1: The thickness on-axis of the first lens L1;
d2: The distance on-axis from the image side surface of the first lens L1 to the object side surface of the second lens L2;
d3: The thickness on-axis of the second lens L2;
d4: The distance on-axis from the image side surface of the second lens L2 to the object side surface of the third lens L3;
d5: The thickness on-axis of the third lens L3;
d6: The distance on-axis from the image side surface of the third lens L3 to the object side surface of the fourth lens L4;
d7: The thickness on-axis of the fourth lens L4;
d8: The distance on-axis from the image side surface of the fourth lens L4 to the object side surface of the fifth lens L5;
d9: The thickness on-axis of the fifth lens L5;
d10: The distance on-axis from the image side surface of the fifth lens L5 to the object side surface of the optical filter GF;
d11: The thickness on-axis of the optical filter GF;
d12: The distance on-axis from the image side surface to the image surface of the optical filter GF;
nd1: The refractive power of the first lens L1;
nd2: The refractive power of the second lens L2;
nd3: The refractive power of the third lens L3;
nd4: The refractive power of the fourth lens L4;
nd5: The refractive power of the fifth lens L5;
ndg: The refractive power of the optical filter GF;
v1: The abbe number of the first lens L1;
v2: The abbe number of the second lens L2;
v3: The abbe number of the third lens L3;
v4: The abbe number of the fourth lens L4;
v5: The abbe number of the fifth lens L5;
vg: The abbe number of the optical filter GF.

Table 9 shows the aspherical surface data of each lens of the camera optical lens 20 in embodiment 2 of the present invention.

TABLE 9

| | Conic Index | Aspherical Surface Index | | | | | | |
|---|---|---|---|---|---|---|---|---|
| | k | A4 | A6 | A8 | A10 | A12 | A14 | A16 |
| R1 | 1.7332E−02 | −7.7130E−03 | 7.1476E−02 | −1.9913E−01 | 3.4605E−01 | −3.8279E−01 | 2.5472E−01 | −8.1689E−02 |
| R2 | −7.0285E+01 | 6.2353E−03 | −1.5752E−01 | 6.4614E−01 | −1.3710E+00 | 1.6516E+00 | −1.0795E+00 | 2.9100E−01 |
| R3 | 9.9113E+01 | −1.1265E−02 | 1.0524E−01 | −2.7918E−02 | −6.2797E−02 | 6.7355E−02 | −9.0306E−03 | −1.5999E−03 |

TABLE 9-continued

| | Conic Index | Aspherical Surface Index | | | | | | |
|---|---|---|---|---|---|---|---|---|
| | k | A4 | A6 | A8 | A10 | A12 | A14 | A16 |
| R4 | 2.7402E+01 | −1.7125E−02 | 6.6620E−01 | −3.1838E+00 | 9.8114E+00 | −1.7072E+01 | 1.5581E+01 | −5.7884E+00 |
| R5 | 8.7193E+01 | −1.7755E−01 | 3.3739E−01 | −1.7520E+00 | 5.5378E+00 | −1.0169E+01 | 9.8685E+00 | −3.8884E+00 |
| R6 | 4.7260E+00 | −1.3716E−01 | 4.3755E−03 | 1.5725E−01 | −3.9645E−01 | 4.2907E−01 | −1.8523E−01 | 1.9478E−02 |
| R7 | 7.2986E+00 | −7.7597E−02 | 6.8365E−02 | −7.5257E−02 | 6.1755E−02 | −2.4339E−02 | 4.3999E−03 | −3.0576E−04 |
| R8 | −8.5794E−01 | 1.5213E−01 | −1.3681E−01 | 1.0533E−01 | −4.3231E−02 | 1.0707E−02 | −1.5355E−03 | 8.6682E−05 |
| R9 | −9.6526E+00 | −7.3878E−02 | 2.7324E−02 | −3.2885E−03 | 2.3667E−04 | −5.6318E−05 | 9.3774E−06 | −5.0265E−07 |
| R10 | −1.2741E+01 | −6.0798E−02 | 2.3219E−02 | −7.8856E−03 | 1.7404E−03 | −2.3915E−04 | 1.8924E−05 | −6.4868E−07 |

Table 10 and table 11 show the inflexion points and the arrest point design data of the camera optical lens 20 lens in embodiment 2 of the present invention. In which, R1 and R2 represent respectively the object side surface and image side surface of the first lens L1, R3 and R4 represent respectively the object side surface and image side surface of the second lens L2, R5 and R6 represent respectively the object side surface and image side surface of the third lens L3, R7 and R8 represent respectively the object side surface and image side surface of the fourth lens L4, R9 and R10 represent respectively the object side surface and image side surface of the fifth lens L5. The data in the column named "inflexion point position" are the vertical distances from the inflexion points arranged on each lens surface to the optic axis of the camera optical lens 20. The data in the column named "arrest point position" are the vertical distances from the arrest points arranged on each lens surface to the optic axis of the camera optical lens 20.

TABLE 10

| | Inflexion point number | Inflexion point position 1 | Inflexion point position 2 | Inflexion point position 3 |
|---|---|---|---|---|
| R1 | 1 | 1.025 | | |
| R2 | 1 | 0.745 | | |
| R3 | 1 | 0.325 | | |
| R4 | 1 | 0.875 | | |
| R5 | 0 | | | |
| R6 | 0 | | | |
| R7 | 2 | 1.115 | 1.455 | |
| R8 | 2 | 1.105 | 1.585 | |
| R9 | 1 | 1.315 | | |
| R10 | 3 | 0.575 | 2.465 | 2.665 |

TABLE 11

| | Arrest point number | Arrest point position 1 |
|---|---|---|
| R1 | 0 | |
| R2 | 1 | 0.995 |
| R3 | 1 | 0.475 |
| R4 | 0 | |
| R5 | 0 | |
| R6 | 0 | |
| R7 | 0 | |
| R8 | 0 | |
| R9 | 0 | |
| R10 | 1 | 1.295 |

Figure 6:
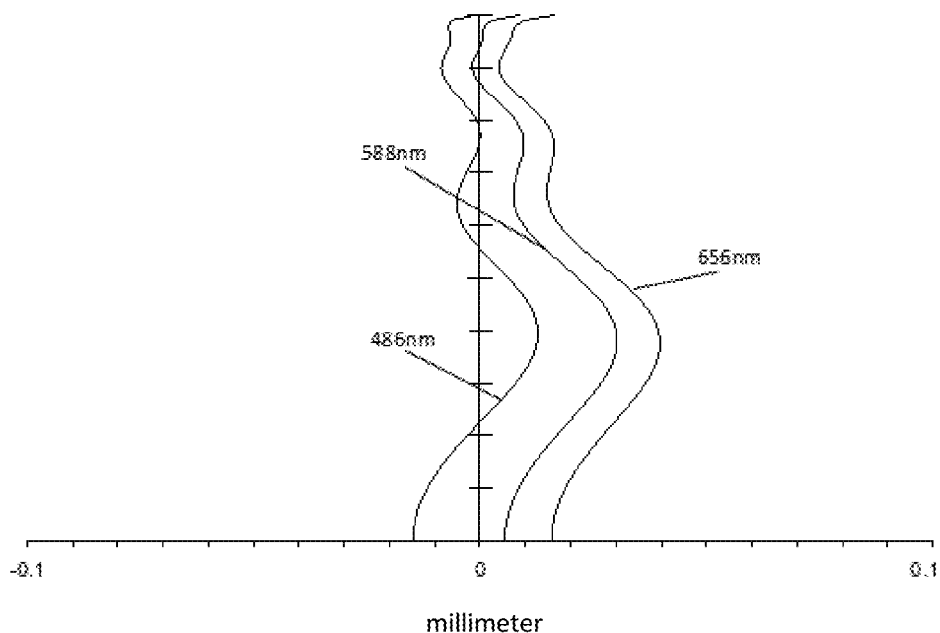
FIG. 6 presents the longitudinal aberration of the camera optical lens shown in FIG. 5.
Figure 7:
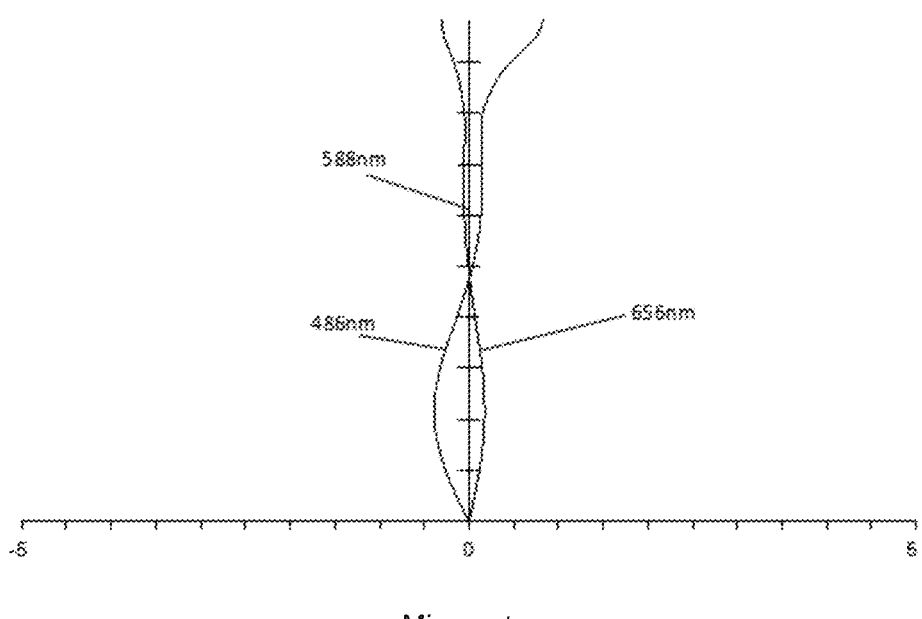
FIG. 7 presents the lateral color of the camera optical lens shown in FIG. 5.
Figure 8:
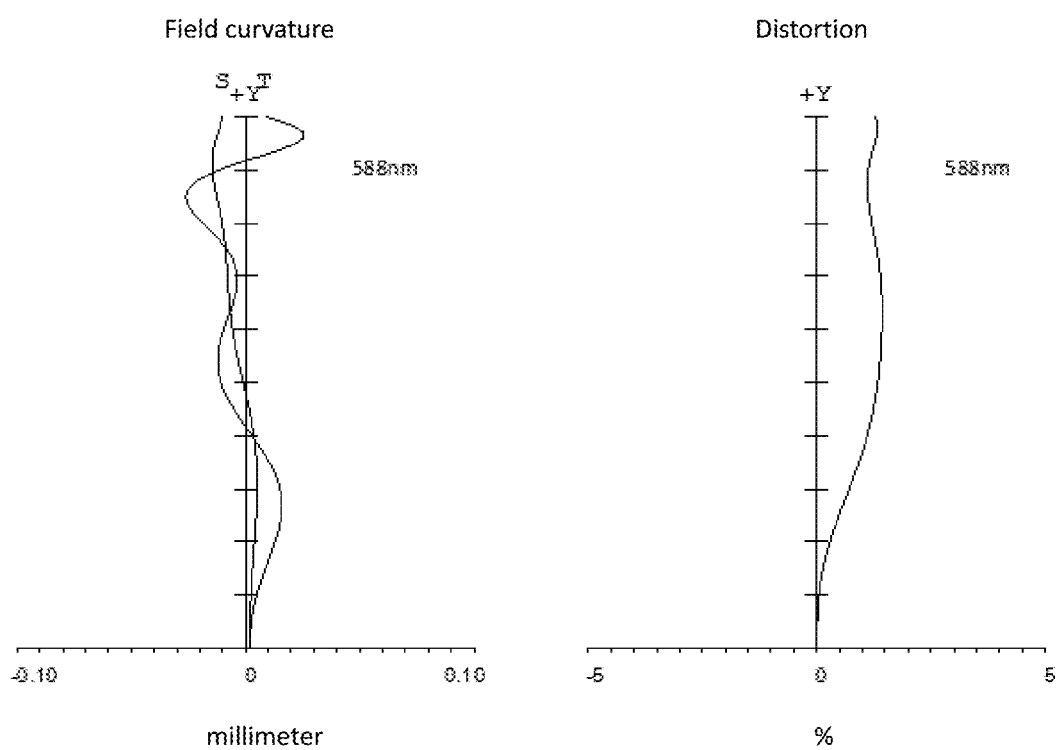
FIG. 8 presents the field curvature and distortion of the camera optical lens shown in FIG. 5.

FIG. 6 and FIG. 7 show the longitudinal aberration and lateral color schematic diagrams after light with a wavelength of 486 nm, 588 nm and 656 nm passes the camera optical lens 20 in the second embodiment. FIG. 8 shows the field curvature and distortion schematic diagrams after light with a wavelength of 588 nm passes the camera optical lens 20 in the second embodiment.

As shown in Table 12, the second embodiment satisfies the various conditions.

TABLE 12

| | Embodiment 2 |
|---|---|
| $0.75 < f1/f < 0.80$ | 0.782763565 |
| $-2.1 < f2/f < -1.9$ | −1.956952125 |
| $-15 < f3/f < -13$ | −13.61102326 |
| $0.57 < f4/f < 0.61$ | 0.591253046 |
| $-0.52 < f5/f < -0.48$ | −0.504494062 |
| $3.6 < n2*n3 < 3.9$ | 3.738353858 |
| $17 < 1/(d3*d5) < 19$ | 18.01412307 |
| $0.7 < (R3 + R4)/(R3 - R4) < 0.8$ | 0.773125365 |

In this embodiment, the pupil entering diameter of the camera optical lens is 2.06 mm, the full vision field image height is 3.261 mm, the vision field angle in the diagonal direction is 79.15°.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens comprising, from an object side to an image side in sequence, a first lens having a positive refractive power, a second lens having a negative refractive power, a third lens having a negative refractive power, a fourth lens having a positive refractive power, a fifth lens having a negative refractive power; wherein the camera optical lens further satisfies the following conditions:

$0.75 < f1/f < 0.80$;

$-2.1 < f2/f < -1.9$;

$-15 < f3/f < -13$;

$0.57 < f4/f < 0.61$;

$-0.52 < f5/f < -0.48$;

$0.7 < (R3+R4)/(R3-R4) < 0.8$;

where
f: the focal length of the camera optical lens;
f1: the focal length of the first lens;
f2: the focal length of the second lens;
f3: the focal length of the third lens;
f4: the focal length of the fourth lens;
f5: the focal length of the fifth lens.

R3: the curvature radius of object side surface of the second lens;
R4: the curvature radius of image side surface of the second lens.

2. The camera optical lens as described in claim 1 further satisfying the following condition:

$3.6 < n2*n3 < 3.9$; where n2: the refractive power of the second lens;
n3: the refractive power of the third lens.

3. The camera optical lens as described in claim 1, further satisfying the following condition:

$17 < 1/(d3*d5) < 19$; where d3: the thickness on-axis of the second lens;
d5: the thickness on-axis of the third lens.

4. The camera optical lens as described in claim 1 further satisfying the following conditions:

$2.9 < f1 < 3.1$;

$-7.9 < f2 < -7.4$;

$-58 < f3 < -50$;

$2.2 < f4 < 2.4$;

$-2.1 < f5 < -1.9$; where f1: the focal length of the first lens;
f2: the focal length of the second lens;
f3: the focal length of the third lens;
f4: the focal length of the fourth lens;
f5: the focal length of the fifth lens.

5. The camera optical lens as described in claim 1, further satisfying the following conditions:

$1.5 < n1 < 1.6$;

$1.8 < n2 < 1.9$;

$1.9 < n3 < 2.1$;

$1.53 < n4 < 1.55$;

$1.52 < n5 < 1.55$; where n1: the refractive index of the first lens;
n2: the refractive index of the second lens;
n3: the refractive index of the third lens;
n4: the refractive index of the fourth lens;
n5: the refractive index of the fifth lens.

6. The camera optical lens as described in claim 1 further satisfying the following conditions:

$55 < v1 < 57$;

$23 < v2 < 25$;

$19 < v3 < 21$;

$55 < v4 < 57$;

$55 < v5 < 57$; where v1: The abbe number of the first lens;
v2: The abbe number of the second lens;
v3: The abbe number of the third lens;
v4: The abbe number of the fourth lens;
v5: The abbe number of the fifth lens.

7. The camera optical lens as described in claim 1, wherein the total optical length of the camera optical lens is less than or equal to 4.6 mm.

8. The camera optical lens as described in claim 1, wherein the aperture F number of the camera optical lens is less than or equal to 1.9.

9. The camera optical lens as described in claim 1 further satisfying the following condition:

$0.8 < d3/d5 < 0.9$; where d3: the thickness on-axis of the second lens;
d5: the thickness on-axis of the third lens.

* * * * *